(12) United States Patent
Butler et al.

(10) Patent No.: US 10,363,726 B2
(45) Date of Patent: Jul. 30, 2019

(54) SEPTUMIZATION OF HONEYCOMB SANDWICHES

(71) Applicant: The Boeing Company, Chicago, IL (US)

(72) Inventors: Geoffrey Allen Butler, Seattle, WA (US); Justin Honshune Lan, Bothell, WA (US); Noel T. Gerken, Maple Valley, WA (US); Garry M. Duschl, Issaquah, WA (US); Benjamin Julius Day, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 15/345,708

(22) Filed: Nov. 8, 2016

(65) Prior Publication Data

US 2017/0072674 A1 Mar. 16, 2017

Related U.S. Application Data

(62) Division of application No. 13/953,456, filed on Jul. 29, 2013, now Pat. No. 9,643,392.

(51) Int. Cl.
| | |
|---|---|
| *B32B 3/12* | (2006.01) |
| *B32B 3/26* | (2006.01) |
| *F02K 1/82* | (2006.01) |
| *B29D 99/00* | (2010.01) |
| *B32B 37/14* | (2006.01) |

(Continued)

(52) U.S. Cl.
CPC ........ *B32B 37/146* (2013.01); *B29D 99/0021* (2013.01); *B32B 3/12* (2013.01); *B32B 3/266* (2013.01); *B32B 7/12* (2013.01); *B32B 15/02* (2013.01); *B32B 27/06* (2013.01); *B32B 37/12* (2013.01); *F02C 7/045* (2013.01); *F02K 1/827* (2013.01); *G10K 11/168* (2013.01); *G10K 11/172* (2013.01); *B29L 2031/7504* (2013.01); *B32B 2605/00* (2013.01); *B32B 2605/18* (2013.01); *B64D 2033/0206* (2013.01); *F05D 2220/323* (2013.01); *F05D 2230/23* (2013.01);

(Continued)

(58) Field of Classification Search
CPC ......... B32B 37/146; B32B 3/12; B32B 3/266; B29D 99/0021; F02C 7/045; F02K 1/827
USPC ................................ 181/210, 213, 214, 292
See application file for complete search history.

(56) References Cited

U.S. PATENT DOCUMENTS

| | | | |
|---|---|---|---|
| 3,700,067 | A | 10/1972 | Dobbs et al. |
| 3,819,007 | A | 6/1974 | Wirt |

(Continued)

FOREIGN PATENT DOCUMENTS

| | | |
|---|---|---|
| EP | 0352993 A1 | 1/1990 |
| EP | 2472509 A1 | 4/2012 |

(Continued)

OTHER PUBLICATIONS

International Search Report and Written Opinion, dated Feb. 16, 2015, regarding Application No. PCT/US2014/040982, 13 pages.

(Continued)

*Primary Examiner* — Jeremy A Luks
(74) *Attorney, Agent, or Firm* — Yee & Associates, P.C.

(57) ABSTRACT

An acoustic liner having a honeycomb core is fabricated by forming septa in a sheet of material, and assembling the sheet of material and the core. During the assembly process, the septa are respectively inserted as a group into cells of the core.

20 Claims, 6 Drawing Sheets

(51) Int. Cl.

| | |
|---|---|
| *F02C 7/045* | (2006.01) |
| *B32B 37/12* | (2006.01) |
| *G10K 11/168* | (2006.01) |
| *G10K 11/172* | (2006.01) |
| *B32B 7/12* | (2006.01) |
| *B32B 15/02* | (2006.01) |
| *B32B 27/06* | (2006.01) |
| *B64D 33/02* | (2006.01) |
| *B29L 31/00* | (2006.01) |

(52) U.S. Cl.
CPC .. *F05D 2250/283* (2013.01); *F05D 2260/963* (2013.01); *Y02T 50/672* (2013.01)

(56) References Cited

U.S. PATENT DOCUMENTS

| | | | |
|---|---|---|---|
| 3,831,710 A | 8/1974 | Wirt | |
| 3,887,031 A | 6/1975 | Wirt | |
| 3,952,831 A * | 4/1976 | Bernard | B32B 3/12 |
| | | | 181/292 |
| 4,235,303 A | 11/1980 | Dhoore et al. | |
| 4,248,647 A | 2/1981 | Herron et al. | |
| 4,257,998 A | 3/1981 | Diepenbrock, Jr. et al. | |
| 4,265,955 A | 5/1981 | Harp et al. | |
| 4,384,020 A | 5/1983 | Beggs et al. | |
| 4,452,335 A | 6/1984 | Mathews et al. | |
| 4,465,725 A | 8/1984 | Riel | |
| 4,671,841 A | 6/1987 | Stephens | |
| 5,041,323 A | 8/1991 | Rose et al. | |
| 5,175,401 A | 12/1992 | Arcas et al. | |
| 5,445,861 A | 8/1995 | Newton et al. | |
| 5,543,198 A | 8/1996 | Wilson | |
| 6,114,652 A | 9/2000 | Clarke et al. | |
| 6,182,787 B1 | 2/2001 | Kraft et al. | |
| 6,274,216 B1 * | 8/2001 | Gonidec | B32B 3/12 |
| | | | 428/116 |
| 6,509,081 B1 | 1/2003 | Diamond | |
| 6,607,625 B2 | 8/2003 | Andre et al. | |
| 6,767,606 B2 | 7/2004 | Jackson et al. | |
| 6,840,349 B2 | 1/2005 | Andre et al. | |
| 6,871,725 B2 * | 3/2005 | Johnson | B64D 29/00 |
| | | | 181/284 |
| 7,328,771 B2 | 2/2008 | Costa et al. | |
| 7,434,659 B2 | 10/2008 | Ayle | |
| 7,510,052 B2 | 3/2009 | Ayle | |
| 7,854,298 B2 | 12/2010 | Ayle | |
| 7,913,813 B1 | 3/2011 | Mathur | |
| 7,921,966 B2 | 4/2011 | Chiou et al. | |
| 8,037,967 B2 | 10/2011 | Mercat | |
| 8,047,329 B1 | 11/2011 | Douglas et al. | |
| 8,066,098 B2 | 11/2011 | Ayle | |
| 8,413,761 B2 | 4/2013 | Ayle | |
| 8,511,429 B1 | 8/2013 | Yu et al. | |
| 8,820,477 B1 | 9/2014 | Herrera et al. | |
| 9,643,392 B2 | 5/2017 | Butler et al. | |
| 2005/0006529 A1 | 1/2005 | Moe et al. | |
| 2006/0219477 A1 | 10/2006 | Ayle | |
| 2009/0039539 A1 | 2/2009 | Emori et al. | |
| 2010/0181420 A1 | 7/2010 | Porte et al. | |
| 2011/0151183 A1 | 6/2011 | Reller et al. | |
| 2012/0037449 A1 | 2/2012 | Ayle | |
| 2015/0027629 A1 | 1/2015 | Butler et al. | |
| 2015/0030803 A1 | 1/2015 | Butler et al. | |

FOREIGN PATENT DOCUMENTS

| | | | |
|---|---|---|---|
| GB | 1470036 A | 4/1977 | |
| GB | 2005384 A | 4/1979 | |
| GB | 2019937 A | 11/1979 | |
| GB | 2056367 A | 3/1981 | |
| GB | 2122540 A | 1/1984 | |

OTHER PUBLICATIONS

Liu et al., "A multiple degree of freedom electromechanical Helmholtz resonator," Acoustic Society of America, vol. 122, No. 1, Jul. 2007, pp. 291-301.

Han, "Sound Reduction by a Helmholtz Resonator," Masters Thesis, Lehigh University, Sep. 2008, 110 pages.

"Hexweb Acousti-Cap," Hexcel Corporation, copyright 2010, 4 pages. http://www.hexcel.com/Resources/DataSheets/Brochure-Data-Sheets/HexWeb_Acousti-Cap.pdf.

"Purolator Acoustic Porous Metals," Purolator Advanced Filtration, copyright 2006, 3 pages. http://www.purolator-facet.com/acoustic.htm.

Office Action, dated Jul. 9, 2015, regardsing U.S. Appl. No. 13/953,456, 26 pages.

Final Office Action, dated Sep. 28, 2015, regarding U.S. Appl. No. 13/953,456, 18 pages.

Office Action, dated Feb. 2, 2016, regarding U.S. Appl. No. 13/953,456, 15 pages.

Notice of Allowance, dated Jul. 6, 2016, regarding U.S. Appl. No. 13/953,456, 9 pages.

\* cited by examiner

FIG. 8

SEPTUMIZATION OF HONEYCOMB SANDWICHES

CROSS REFERENCE AND PRIORITY

This application is a divisional application of U.S. patent application Ser. No. 13/953,456, filed Jul. 29, 2013 and issued as U.S. Pat. No. 9,643,392 on May 9, 2017, the entire disclosure of which is incorporated by reference herein.

BACKGROUND INFORMATION

1. Field

The present disclosure generally relates to acoustic treatments for reducing noise, and deals more particularly with septumization of honeycomb sandwiches used as acoustic liners.

2. Background

Aircraft engines produce noise primarily due to rotating blades which compress the airflow as well as rotating blades which extract energy from the airflow and the high-speed airflow through the exhaust nozzles. In order to reduce noise and satisfy noise regulations governing commercial aircraft, aircraft engines may incorporate acoustic panels in various parts of the engine, such as in the nacelle inlets, as well as the aft bypass duct and primary nozzle. These acoustic panels, sometimes referred to as acoustic treatments or acoustic liners, may comprise a honeycomb core sandwiched between a perforated inner skin and a non-perforated outer skin. The honeycomb core often has a middle layer of porous material called a septum which is used to increase the acoustic performance of the liner. The design parameters of the septum in the cells of the honeycomb core usually consist of the porosity of the layer as well as the depth or location relative to the perforated inner skin. The cavities that are formed by the septum act as Helmholtz resonators which attenuate the engine noise.

There are at least three known methods for septumization of honeycomb cores. The first method requires splitting the core and using an adhesive to bond a septum layer between the split cores. Splitting the core to allow a septum layer to be installed generally decreases the mechanical performance of the core, making this septumization technique unsuitable for some applications. The second method involves a lost wax process which creates a buried septum, where a honeycomb core is pressed into wax. A thin layer of liquid resin floats on top of the wax which is then cured to form a solid layer and the wax is melted out of the honeycomb core. This buried septum process requires an extra step in which a laser is used to perforate the solid septum layer to the desired porosity. The third method involves using an automated robotic process where individual septum pieces with tabs are inserted into each honeycomb cell. The tabs of the individual septum pieces are bonded to the honeycomb cell walls by carefully dipping the honeycomb panel to a certain depth into a liquid adhesive. The process of installing the individual septum pieces can be time consuming and expensive. Furthermore, this process is generally restricted to honeycomb with hex-shaped cells which can sometimes be restrictive to the nacelle design due to the potential difficulty in forming a shape with a small radius of curvature.

Accordingly, there is a need for a method of septumizing a honeycomb core used in an acoustic sandwich structure which obviates the need for installing individual septum pieces in the core cells, or splitting the core to allow the installation of a septum layer, or the many steps in using a lost wax process to create a solid septum layer and then using a laser to perforate the solid septum layer.

SUMMARY

The disclosed embodiments provide a method for septumizing honeycomb cores of sandwich panels used for acoustic treatments. The disclosed method avoids the need for splitting the core during septum installation as well as the many manufacturing steps required in using the lost wax process or using automated robotic equipment to insert individual septums into each honeycomb cell. A large number of honeycomb core cells may be septumized quickly and easily.

According to one disclosed embodiment, a method is provided of producing an acoustic liner having a honeycomb core. The method comprises forming septa in a sheet of material, and assembling the sheet of material and the core, including inserting the septa respectively into cells of the core. Forming the septa may be performed by injection molding a plastic, or stamping a sheet of material between a pair of dies in a compression molding technique, or thermo-forming a sheet of plastic. The septa may be inserted simultaneously as a group into cells of the core, either through the top or the bottom of the core. Forming the septa includes forming a plurality of substantially hollow cones, and selecting volumes for the hollow cones that form resonant cavities. The method may further comprise bonding the sheet of material to the core by placing a reticulated film adhesive between the sheet of material and edges of cells in the core.

According to another disclosed embodiment, a method is provided for attenuating sound with a honeycomb core, comprising installing a sheet of porous material having multiple cones into the honeycomb core. The multiple cones respectively form septa in cells of the honeycomb core, and the method may further comprise choosing a size and shape for the multiple cones that results in the multiple cones functioning as Helmholtz resonators. The method may also comprise forming the sheet of porous material using a woven or non-woven material selected from at least one of a plastic sheet or a metal sheet. The cones are used to form multiple acoustic cell inserts based on acoustic requirements which also meet geometric tolerances and restrictions of the honeycomb core cells. The cones may have uniform heights or non-uniform heights.

According to still another disclosed embodiment, a method is provided of septumizing a honeycomb core, comprising installing a sheet of septa into the core. The sheet is installed by adhesively bonding the sheet to the core. The bonding may include placing a reticulated film adhesive between edges of cells of the core and the sheet. Installing the sheet includes inserting the septa respectively into cells of the honeycomb core.

According to another disclosed embodiment, a method is provided of fabricating septa for a cellular core. The method comprises fabricating a sheet of material. Fabricating the sheet of material includes integrally forming a plurality of septa in the sheet of material respectively corresponding to cells of the core.

According to a further disclosed embodiment, a device is provided for septumizing a core of honeycomb cells, comprising a perforated sheet including a plurality of septa respectively adapted to be inserted into the honeycomb cells. The septa have substantially conical shapes, and are formed integral with the sheet.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
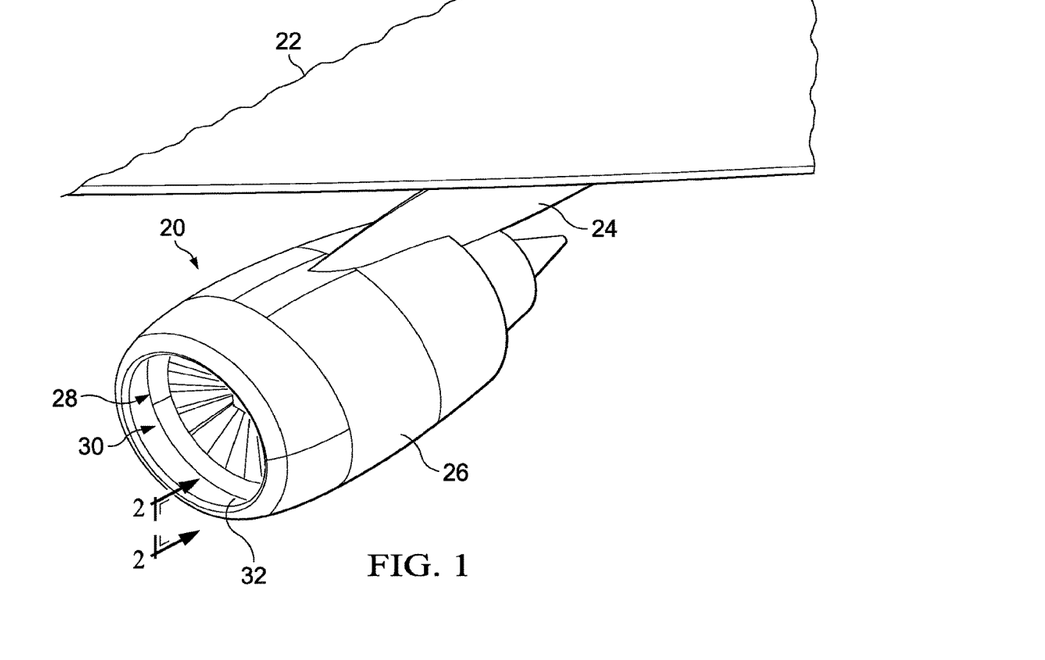
FIG. 1 is an illustration of a perspective view of a portion of the wing showing an engine having an acoustically treated inlet.

The disclosed embodiments relate to an acoustic treatment that can be used in any of a wide variety of applications for attenuating noise. For example, and without limitation, referring to FIG. 1, a high bypass engine 20 is mounted an aircraft wing 22 by a pylon 24. The engine 20 includes a surrounding engine nacelle 26 having an air inlet 28. The air inlet 28 includes an acoustically treated area 30 in the form of an acoustic liner 32 for reducing noise caused by high airflow through the air inlet 28 into the engine 20.

Figure 2:
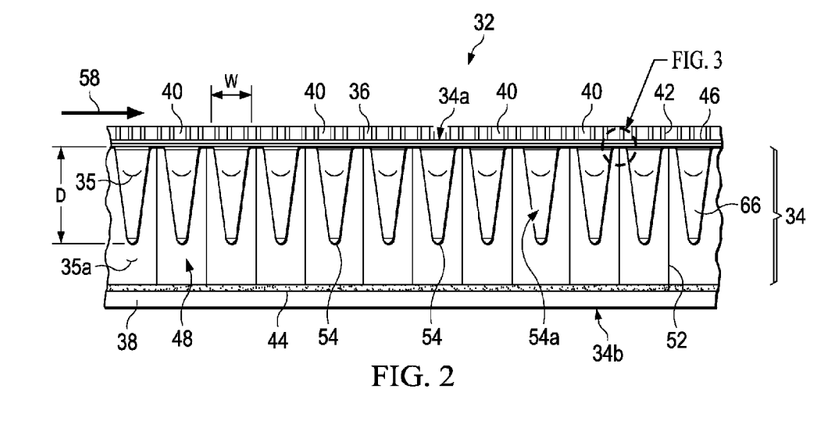
FIG. 2 is an illustration of a cross-sectional view of a portion of a honeycomb sandwich forming part of the engine inlet shown in FIG. 1.

Attention is now directed to FIG. 2 which illustrates additional details of the acoustic liner 32. The acoustic liner 32 is a sandwich panel construction which broadly comprises a cellular honeycomb core 34 sandwiched between inner and outer facesheets 36, 38 respectively. The inner facesheet 36 includes a multiplicity of perforations 40 therein which allow sound waves, including noise to pass through the inner facesheet 36 into the core 34. The inner facesheet 36 is attached to the top 34a of the honeycomb core 34 by an adhesive bond line 42. Similarly, the outer facesheet 38 is attached to the bottom 34b of the honeycomb core 34 by an adhesive bond line 44.

Figure 3:
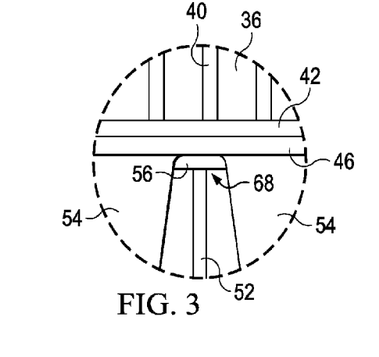
FIG. 3 is an illustration of an enlarged, cross-sectional view of the area designated as "FIG. 3" in FIG. 2.

In the illustrated embodiments, the inner and outer facesheets 36, 38 respectively each comprise a laminated composite such as a CFRP (carbon fiber reinforced plastic) however, either of these facesheets may comprise other materials such as, without limitation, a ceramic, a metal such as aluminum. The honeycomb core 34 may comprise a metal such as aluminum, a polymer or other materials and is formed of a multiplicity of individual polygonal cells 48 defined by cell walls 52. In the illustrated example, the cells 48 are hexagonal, however other cell geometries are possible. The honeycomb core 34 is septumized by a septa insert 46 comprising a plurality of individual septums 54 arranged as an integrated group or array. As shown in FIG. 3, the septa insert 46 is bonded to edges 68 of the cell walls 52 by a reticulated film adhesive 56.

The individual septums 54, collectively referred to as septa 54, respectively extend down into the cells 48 of the honeycomb core 34 a desired depth "D" and have a maximum cross sectional dimension "W" (see also FIG. 5), forming cavities 66 within the cells 48 of a preselected volume, shape and surface area which achieve a desired acoustic performance for a chosen application. For example, in the case of an acoustic liner 32 for aircraft applications, the size, shape and surface area of the septa 54 may be selected to form resonant cavities 66 that assist in canceling or damping sound waves/noise flowing at 58 over the acoustic liner 32 which enter honeycomb core 34 through the perforations in the inner facesheet 36. In the embodiment illustrated in FIG. 2, the septa 54 have a substantially uniform depth "D", however in other embodiments the septa depth "D" may vary over the area of the honeycomb core 34, allowing the acoustic liner 32 to be tuned in different areas to attenuate different types of noise, such as noises in different frequency ranges.

In the embodiment illustrated in FIGS. 2 and 3, the septa 54 each have a generally conical shape, however, as will be discussed below in more detail, the chosen shape of the septa 54 will depend on the application. Generally, the septa 54 will have sides 54a (FIGS. 2, 4 and 5) that are angled relative to sound waves 35 propagating downwardly from the perforations 40 in the inner facesheet 36 through the cells 48. The septa 54 are perforated or may be formed from a porous material that allows a portion 35a of the sound wave 35 to pass through the septa 54, downwardly through the cells 48 toward the outer facesheet 38.

Figures 4, 4A:
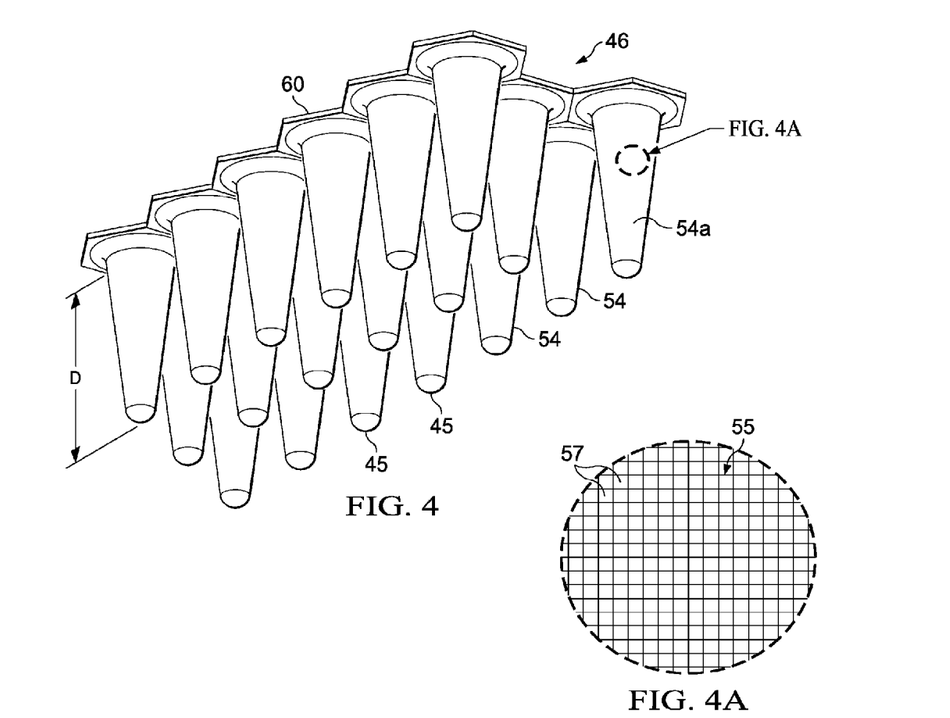
FIG. 4 is an illustration of a bottom, perspective view of a formed sheet of septa.
FIG. 4A illustration of the area designated as "FIG. 4A" in FIG. 4, better illustrating perforations in the septums.
Figure 5:
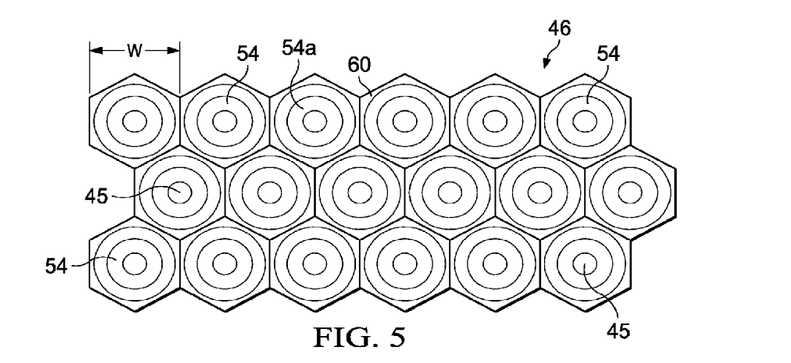
FIG. 5 is an illustration of a bottom view of the formed sheet of septa shown in FIG. 4.

Attention is now directed to FIGS. 4, 4A and 5 which illustrate one embodiment of the septa insert 46 in which the individual septums 54 have a substantially conical shape which terminates in an outer tip 45. The septa 54 are arranged in an array substantially matching the geometry of the cells 48 (FIG. 2) of the core 34. In this embodiment, the septa 54 are integrally formed with a sheet 60 of suitable material such as, without limitation, a thermoplastic, a thermoset, a ceramic, or a metal. The septa insert 46 may comprise a single part covering substantially the entire area of the core 34, or may be divided into sections (not shown), each of which comprises multiple, integrated septa 54 which are adapted to be inserted into a corresponding group of the core cells 48. The septa 54 contain porosities that render them pervious to a desired degree in order for a portion of the sound waves 35 (FIG. 2) to pass therethrough. For example, referring to FIG. 4A, the septa 54 may be formed of a woven or non-woven plastic or metal mesh 55 containing perforations 57 or other interstices which allow a portion of the incident soundwave energy to pass through the septa 54. The porosity of the septa 54 over the septa insert 46 may be constant or may vary. Similarly, the size, shape, depth or other characteristics of the individual septa 54 may be constant, or may vary over the area of the septa insert 46.

Figure 6:
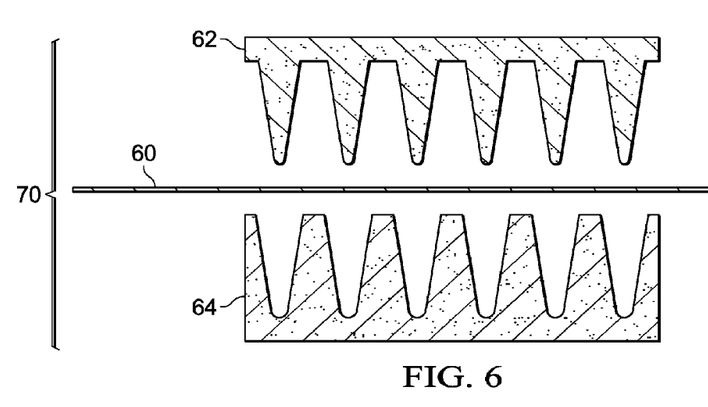
FIG. 6 is an illustration of a cross-sectional view of a flat sheet of material about to be formed by a die set.
Figure 7:
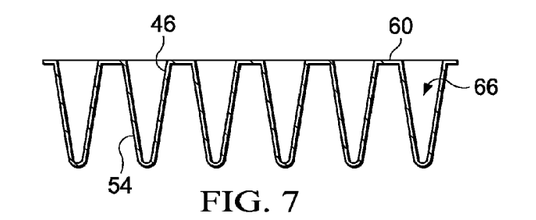
FIG. 7 is an illustration of a side view of the sheet of material after it has been formed into a septa insert.

The septa insert 46 may be fabricated using any of a variety of known fabrication techniques. For example, and without limitation, FIG. 6 illustrates one fabrication technique in which a substantially flat sheet 60 of suitable porous material such as a plastic mesh or perforated metal, is formed into the desired septa shapes by stamping the sheet 60 using a die set 70 comprising matching male and female dies 62, 64 respectively. FIG. 7 illustrates the formed septa insert 46 following the stamping process shown in FIG. 7. In this example, the septa insert 46 is of a substantially one-piece, unitary construction comprising a sheet 60 containing an array of integrally formed septa 54. Septa inserts 46 having septa 54 of different depths, volumes and shapes can be fabricated simply by changing the die set 70. It may also be possible to form multiple septa 54 that are adapted for insertion into each individual cell 48 of the core 34. For example, multiple septa 54 may be nested within each other in each cell 48. Such nested septa 54 may comprise, for example and without limitation, a narrower and deeper septa 54 (not shown) formed and nested within a wider, more shallow septa 54. It may also be possible to form multiple septa 54 within each cell 48 respectively comprising differing materials and/or different cross-sectional shapes, and/or which possess differing acoustic porosities or other acoustic characteristics.

Figure 8:
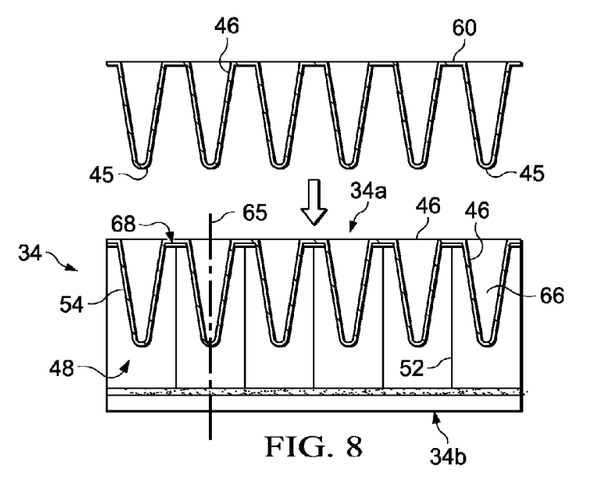
FIG. 8 is an illustration of a side view showing how the formed sheet of septa is inserted into the cells of a honeycomb core.

FIG. 8 illustrates a technique for assembling the septa insert 46 and the core 34. The septa insert 46 is positioned above the top 34a of the core 34, with the tips 45 substantially aligned with the centerlines and 65 Of the core cells 48. Although not shown in FIG. 8, a reticulated film adhesive is placed on the edges 68 of the cell walls 52. The septa insert 46 is then moved downwardly into the core 34 until the sheet 60 contacts the film adhesive and is seated on the edges 68 of the cell walls 52. It may thus be appreciated that multiple septums 54 are inserted simultaneously as a group into the core cells 48. Referring to FIG. 2, fabrication of the acoustic liner 32 is completed by bonding the inner facesheet 36 to the top 34a of the core 34, and bonding the outer facesheet 38 to the bottom 34b of the core 34.

Other techniques may be employed for fabricating the septa insert 46. For example, the septa insert 46 may be produced by plastic injection molding, compression molding or similar molding techniques. Following molding, perforations 57 (FIG. 4A) may be formed in the septa 54 using known techniques, such as through the use of a laser (not shown). It may be also possible to fabricate the septa insert 46 by thermoforming a plastic sheet over a die (not shown) having tool features matching the geometry of the septa insert 46.

Figure 9:
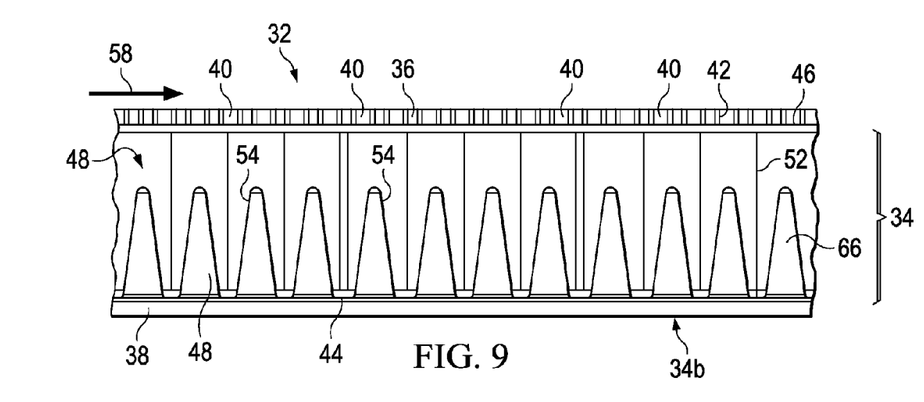
FIG. 9 is an illustration of a view similar to FIG. 2, but showing the septa insert having been installed through the bottom of the honeycomb core.

Referring now to FIG. 9, in an alternate embodiment, the honeycomb core 34 may be septumized by installing the septa insert 46 through the bottom 34b of the core 34. Using this technique, the cone shaped septa 54 are inverted and face the incident sound wave 35. The inverted, cone shaped septa 54 form resonant cavities 66 within the cells 48 of the desired shape and volume. Like the embodiment previously discussed in connection with FIG. 8, the septa insert 46 may be configured to form multiple septa 54 that are adapted for insertion into each individual cell 48 of the core 34. For example, multiple septa 54 may be nested within each other in each cell 48. Such nested septa 54 may comprise, for example and without limitation, a narrower and deeper septa 54 (not shown) formed and nested within a wider, more shallow septa 54. It may also be possible to form multiple septa 54 within each cell 48 respectively comprising differing materials and/or different cross-sectional shapes, and/or which possess differing acoustic porosities or other acoustic characteristics. Moreover, it may be possible to vary the ferocity of the septa 54 across the septa insert 46.

Figure 10:
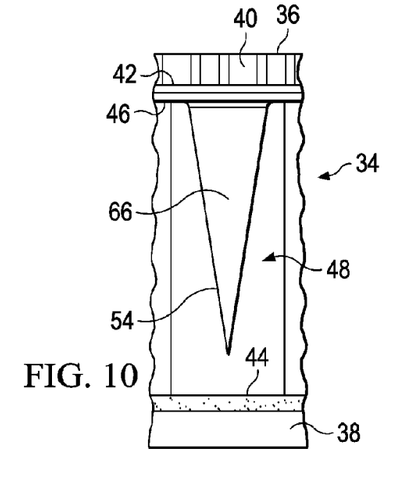
FIG. 10 is an illustration of a cross-sectional view of a single cell, showing a septum having an alternate shape.
Figure 11:
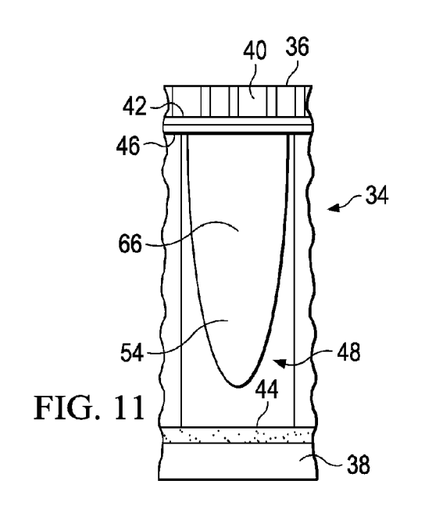
FIG. 11 is an illustration of a cross-sectional view of a single cell, showing a septum having another alternate shape.

As previously mentioned, the septa 54 may have any of various shapes that are useful in tuning the honeycomb core 34 to attenuate noise over a desired range of frequencies. For example, in the alternate embodiment shown in FIG. 10, the septa 54 may have the cross-sectional shape of a pyramid or a cone, and in the embodiment shown in FIG. 11, the septa 54 may have nearly an half-elliptical shape. A range of other septa shapes are possible.

Figure 12:
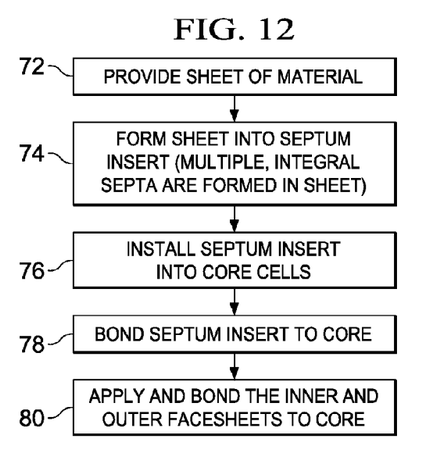
FIG. 12 is an illustration of a flow diagram of a method of septumizing a honeycomb sandwich.

FIG. 12 broadly illustrates the overall steps of a method of fabricating an acoustic liner 32 employing a sandwich panel having the honeycomb core 34 septumized according to the disclosed embodiments. At step 72, a sheet 60 of material is provided which may include perforations 57 therein. At 74, the sheet of material 60 is formed into a septa insert 46 having multiple, integrally formed septa 54. At 76, the septa insert 46 is installed into the core cells 48 by inserting the individual septums 54 into the core cells 48. At 78, the septa insert 46 is bonded to the core 34 using, for example, a reticulated film adhesive 56. At 80, the inner and outer facesheet 36, 38 respectively are bonded to the core 34.

Figure 13:
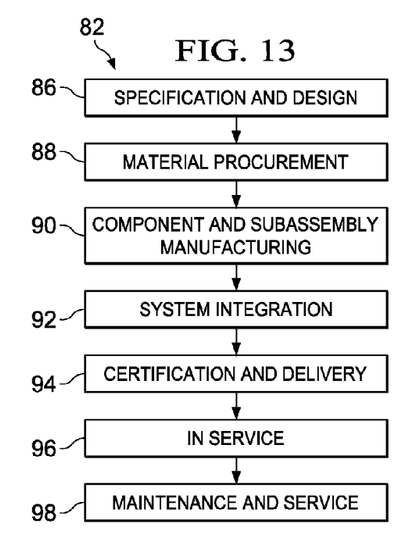
FIG. 13 is an illustration of a flow diagram of aircraft production and service methodology.
Figure 14:
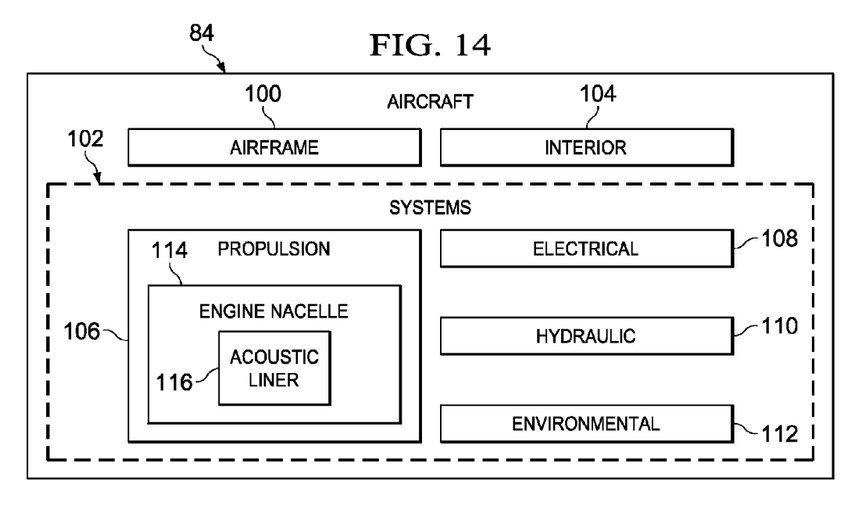
FIG. 14 is illustration of a block diagram of an aircraft.

Embodiments of the disclosure may find use in a variety of potential applications, particularly in the transportation industry, including for example, aerospace, marine, automotive applications and other application where acoustic treatments such as acoustic liners may be used. Thus, referring now to FIGS. 13 and 14, embodiments of the disclosure may be used in the context of an aircraft manufacturing and service method 82 as shown in FIG. 13 and an aircraft 84 as shown in FIG. 14. Aircraft applications of the disclosed embodiments may include, for example, without limitation, acoustic liners for engine nacelles. During pre-production, exemplary method 82 may include specification and design 86 of the aircraft 84 and material procurement 88. During production, component and subassembly manufacturing 90 and system integration 92 of the aircraft 84 takes place. Thereafter, the aircraft 84 may go through certification and delivery 94 in order to be placed in service 96. While in service by a customer, the aircraft 84 is scheduled for routine maintenance and service 98, which may also include modification, reconfiguration, refurbishment, and so on.

Each of the processes of method 82 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 84 produced by exemplary method 82 may include an airframe 100 with a plurality of systems 102 and an interior 104. Examples of high-level systems 102 include one or more of a propulsion system 106, an electrical system 108, a hydraulic system 110 and an environmental system 112. Any number of other systems may be included. The propulsion system 106 may include engine nacelles 114 that are provided with acoustic liners 116 in accordance with the disclosed embodiments. Although an aerospace example is shown, the principles of the disclosure may be applied to other industries, such as the marine and automotive industries.

Systems and methods embodied herein may be employed during any one or more of the stages of the production and service method 82. For example, components or subassemblies corresponding to production process 90 may be fabricated or manufactured in a manner similar to components or subassemblies produced while the aircraft 84 is in service. Also, one or more apparatus embodiments, method embodiments, or a combination thereof may be utilized during the production stages 90, 92, for example, by substantially expediting assembly of or reducing the cost of an aircraft 84. Similarly, one or more of apparatus embodiments, method embodiments, or a combination thereof may be utilized while the aircraft 82 is in service, for example and without limitation, to maintenance and service 98.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device for septumizing a core of honeycomb cells, comprising:
    a perforated sheet including a plurality of septums respectively adapted to be inserted into the honeycomb cells, wherein at least a portion of the plurality of septums comprises an array of septums; and
    a nested septum within in at least one septum in the array of septums, such that the nested septum comprises perforated sides that angle, relative to sound waves that propagate into the core from the perforations in an inner facesheet, such that every side of each septum joins at a tip of each septum.

2. The device of claim 1, wherein each of the septums has a substantially conical shape.

3. The device of claim 1, wherein the septums are integral with the sheet.

4. The device of claim 1, further comprising the device configured to receive and combine:
    an inner facesheet that comprises perforations;
    a septa insert that comprises the array of septums in a sheet that comprises a porous material, such that the septa insert comprises integrally formed, one-piece unitary construction that contains the array of septums, and each septum in the array of septums comprises sides that angle, relative to sound waves that propagate into the core from the perforations in the inner facesheet;
    the nested septum wherein every side of the nested septum joins at a tip of the nested septum, and the nested septum comprises a cross-sectional shape different than a cross-sectional shape of the at least one septum;
    the sheet, tips first, into the core from a side of the core opposite the inner facesheet, such that each cell of the cells of the core receives a septum of the septa insert; and
    an outer facesheet that adheres to the sheet.

5. The device of claim 1, further comprising each septum comprising a size and shape configured, respectively, with characteristics of Helmholtz resonators.

6. The device of claim 4, further comprising the device configured to form the perforated sheet via at least one of:
    injection molding; and
    thermo-forming a sheet of plastic.

7. The device of claim 4, further comprising the septa insert configured to substantially simultaneously insert into the cells of the core as a group through a top of the core.

8. The device of claim 4, further comprising the septa insert configured to be inserted as a group through a bottom of the core.

9. The device of claim 1, further comprising the device configured to:
    form a plurality of substantially hollow cones, and
    form volumes, for the hollow cones, that form resonant cavities.

10. The device of claim 4, further comprising the septa insert bonded to the core via a reticulated film adhesive located between the sheet and edges of cells in the core.

11. A manufacture that comprises a sound attenuator that comprises a honeycomb core that comprises cells configured to attenuate sound via:
    an inner facesheet that comprises perforations and adhered across one side of the honeycomb core; and
    a septa sheet, configured as a single continuous sheet that comprises a porous material, such that the septa sheet comprises an array of septum and each septum, respectively, comprises sides angling relative to sound waves propagating into the honeycomb core from the perforations in the inner facesheet, such that every side of each septum joins, respectively, at a tip of the each septum;
    a nested septum within in at least one septum in the array of septum, such that:
        the nested septum comprises perforated sides that angle, relative to sound waves that propagate into the honeycomb core from the perforations in the inner facesheet;
        every side of the nested septum joins at a tip of the nested septum; and
        the nested septum comprises a cross-sectional shape different than a cross-sectional shape of the at least one septum; and
    the septa sheet configured comprising tips installed first into the honeycomb core from a side of the honeycomb core opposite the inner facesheet, such that each cell of the cells of the honeycomb core receives a septum of the septa sheet.

12. The manufacture of claim 11, further comprising the septa sheet comprising a nested septum such that the nested septum comprises a perforated material selected from at least one of: a plastic sheet, and a metal sheet, that differs from the porous material and the cross-sectional shape of the at least one of the each septum.

13. The manufacture of claim 11, further comprising each septum comprising multiple acoustic cell inserts based on acoustic requirements and geometric cell tolerances of the honeycomb core.

14. The manufacture of claim 11, further comprising the each septum comprising substantially uniform heights.

15. The manufacture of claim 11, further comprising the each septum comprising non-uniform heights that adjust acoustic performance based on characteristics of a noise source.

16. The manufacture of claim 11, further comprising each septum comprising a size and shape configured, respectively, with characteristics of Helmholtz resonators.

17. A manufacture that comprises a septumized honeycomb core that comprises:
cells that comprise polygon shapes;
a porous inner facesheet attached to the septumized honeycomb core; and
a sheet that comprises an array of septum installed into the septumized honeycomb core, such that each cell of the cells of the septumized honeycomb core receives a septum of the sheet and the sheet comprises a porous material such that a size, shape, depth, and porosity of each septum in the array of septum varies depending upon a desired tuning attenuation desired respectively for each cell in the septumized honeycomb core occupied respectively by each septum in the array of septum, and each septum comprises sides that angle relative to sound waves that propagate into the septumized honeycomb core from perforations in the porous inner facesheet, and every side of each septum joins at a tip of the each septum, and at least one septum in the array of septum comprises a nested septum that comprises perforated sides that angle, relative to sound waves that propagate into the septumized honeycomb core from the perforations in the porous inner facesheet, such that every side of the nested septum joins at a tip of the nested septum, within the at least one septum.

18. The manufacture of claim 17, further comprising the sheet adhesively bonded to the septumized honeycomb core.

19. The manufacture of claim 16, further comprising a reticulated film adhesive placed between edges of the cells of the honeycomb core and the sheet.

20. The manufacture of claim 16, further comprising the sheet comprising the septum inserted into the cells of the honeycomb core.

* * * * *